United States Patent [19]
Mochizuki et al.

[11] Patent Number: 5,600,475
[45] Date of Patent: Feb. 4, 1997

[54] LASER SCANNER

[75] Inventors: Takeshi Mochizuki; Susumu Saito; Akira Arimoto, all of Ibaraki, Japan

[73] Assignees: Hitachi Koki Co., Ltd.; Hitachi Ltd., both of Tokyo, Japan

[21] Appl. No.: 277,747

[22] Filed: Jul. 20, 1994

[30] Foreign Application Priority Data

Jul. 23, 1993 [JP] Japan .................................. 5-182422

[51] Int. Cl.⁶ ................................................. G02B 26/08
[52] U.S. Cl. ........................ 359/206; 359/205; 359/216; 347/258; 347/259
[58] Field of Search .................................. 359/216, 206, 359/217, 205, 218, 219; 250/234, 235; 347/258, 259, 256

[56] References Cited

U.S. PATENT DOCUMENTS

| | | | |
|---|---|---|---|
| 5,233,457 | 8/1993 | Hamada et al. | 359/216 |
| 5,255,113 | 10/1993 | Yoshikawa et al. | 359/196 |
| 5,267,075 | 11/1993 | Yamaguchi et al. | 359/216 |
| 5,311,348 | 5/1994 | Yamakawa | 359/216 |

FOREIGN PATENT DOCUMENTS

| | | |
|---|---|---|
| 3922982 | 1/1990 | Germany . |
| 63-253916 | 10/1988 | Japan . |
| 4-60608 | 2/1992 | Japan . |

*Primary Examiner*—Paul M. Dzierzynski
*Assistant Examiner*—Darren E. Schuberg
*Attorney, Agent, or Firm*—Sughrue, Mion, Zinn, Macpeak & Seas

[57] ABSTRACT

An improved laser scanner has a scanning lens composed of a single lens element and at least one surface of that lens element is of such a geometry that the curvature in a direction normal to the scanning direction varies gradually in the scanning direction in accordance with the specific deflecting face of an optical deflector. This laser scanner experiences less curvature of the image plane and achieves high resolution.

1 Claim, 3 Drawing Sheets

CURVATURE OF FIELD IN
SUB-SCAN DIRECTION (mm)

ERROR IN IMAGE HEIGHT (μm)

LASER SCANNER

BACKGROUND OF THE INVENTION

1. Field of the Invention

This invention relates to a laser scanner for use in laser printers and like apparatus.

2. Description of the Related Art

In conventional laser scanners for use in laser printers, an fθ lens as a scanning lens and a rotating polygonal mirror as an optical deflector are combined to deflect a laser beam for scanning over the surface of a photoreceptor drum.

The principal object of such laser scanners is to focus a laser beam on the surface of a photoreceptor drum to form a beam spot of a predetermined size in accordance with a required resolution as it scans over the drum's surface at a regular speed.

A prior art example of the fθ lens assembly for achieving high resolution is described in Unexamined Published Japanese Patent Application (kokai) Sho 63-253916. This lens assembly consists of two lens elements, one being spherical and the other being aspheric. The aspheric lens is provided with an aspheric surface of rotation asymmetry that has the curvature in a direction normal to the scan direction varied asymmetrically with respect to the central optical axis of the lens. This design is effective in reducing the curvature of field that occurs in a direction normal to the scan direction owing to the fact that the point on which a laser beam is reflected by the rotating polygonal mirror varies asymmetrically on the right and left sides with respect to the center of scanning.

Another prior art example of the fθ lens assembly for achieving high resolution is described in Unexamined Published Japanese Patent Application (kokai) Hei 4-60608. This lens assembly consists of two simple lens elements, one of which is provided with an aspherical surface of rotation asymmetry that has its cross-sectional geometry in the main scanning direction varied asymmetrically with respect to the central optical axis of the lens. This design is also effective in reducing the curvature of field that occurs in a direction normal to the scan direction owing to the fact that the point on which a laser beam is reflected by the rotating polygonal mirror varies asymmetrically on the right and left sides with respect to the center of scanning.

These two examples of the prior art make it clear that the higher the resolution that need be achieved by the fθ lens, the more significant is the effect that is exerted on the curvature of field in a direction normal to the scanning direction by the asymmetric variation of the point on which a laser beam is reflected by the rotating polygonal mirror; therefore, it is effective to use a lens surface that is asymmetric with respect to the central optical axis of the lens.

As described above in connection with the prior art, the curvature of field that occurs in a direction normal to the scanning direction can be reduced by using a lens surface that is asymmetric with respect to the central optical axis of the lens.

However, this approach of using a lens element of an asymmetric shape presents its own problem if it is combined with another lens element because any error in the relative positions of the two lens elements can cause significant and by no means negligible effects on the curvature of field that would occur in a direction normal to the scanning direction.

SUMMARY OF THE INVENTION

The present invention has been accomplished under these circumstances and has as an object providing a laser scanner capable of achieving high resolution without suffering from the drawbacks inherent in the prior art systems.

This object can be attained by a laser scanner in which the scanning lens assembly (fθ lens) is composed of one lens element and in which at least one surface of that lens element is of such a geometry that the curvature in a direction normal to the scanning direction varies gradually in the scanning direction in accordance with the specific rotating position of the polygonal mirror used as an optical deflector, thereby correcting the curvature of field that occurs in a direction normal to the scanning direction as a result of the change in the position of a specific reflecting face of the polygonal mirror.

In a preferred embodiment, at least one lens surface of the scanning lens assembly is adapted to have the following geometry in the scanning direction.

Stated specifically, the geometry is expressed by equation (1):

$$Z = X^2/R\{1 + \sqrt{1-(K+1)(X/R)^2}\ \} \qquad (1)$$

where R is the radius of curvature on the optical axis; and K is the conic constant.

In addition, the geometry satisfies the following relation (2):

$$-0.54 \leq (U'/U)|K|^{-1/4} \cdot SIG(K) \leq -0.48 \qquad (2)$$

where U and U' are the angles a ray of light giving a maximum scan width forms with the optical axis on the entrance and exit sides, respectively, of the scanning lens assembly; and SIG(K) represents the sign of K.

Relation (2) is the condition for focusing a laser beam on the surface of a photoreceptor drum to form a beam spot of a predetermined size in accordance with the required resolution as it scans over the drum's surface at a regular speed.

The above and other objects and features of the present invention will be more apparent from the following description taken in conjunction with the accompanying drawings.

DETAILED DESCRIPTION OF THE PREFERRED EMBODIMENTS

Figure 2:
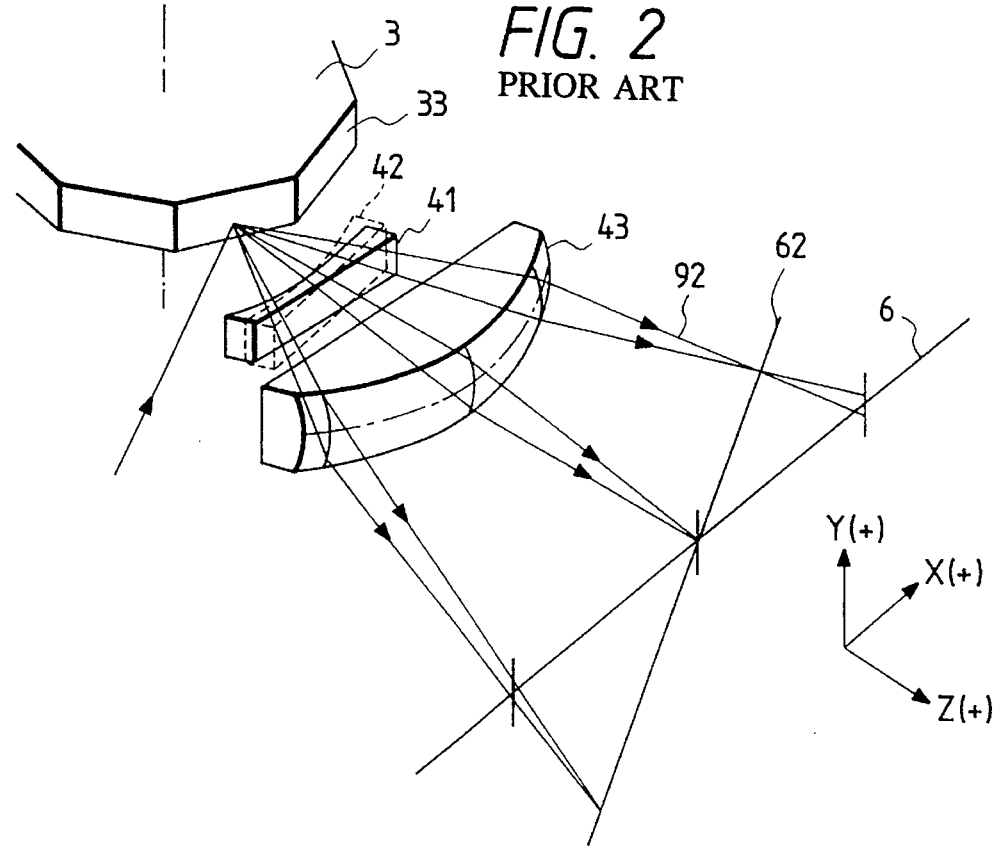
FIG. 2 is a diagram showing a prior art laser scanner.

FIG. 2 shows how the curvature of field develops in a direction normal to the scanning direction in a prior art laser scanner which uses an fθ lens assembly that consists of an asymmetrically shaped lens element and another lens element in the case where said another lens has an error in layout.

In FIG. 2, shown by reference numeral 3 is a rotating polygonal mirror, 6 is the surface of a photoreceptor drum, and 43 is the asymmetrically shaped lens element. Shown by reference numeral 41 or 42 is the another lens element to be combined with the asymmetrically shaped lens 43. Said another lens is assumed to be spherical in the case under consideration; the solid line 41 refers to the case where the spherical lens element has no error in layout whereas the dashed line 42 refers to the case where it has an error in layout. Shown by 92 is a beam that emerges from the lens element 42 in the case where the spherical lens element has an error in layout. Shown by 62 is the image plane formed by the beam 92. The three axes, Z, X and Y are taken along the optical axis, in the main scanning direction and in a direction normal to the scanning direction, respectively. Obviously, if the spherical lens element has an error in layout, the imaging position differs with the scan angle to prevent the correct image from being formed on the surface of a photoreceptor drum.

Figure 3:
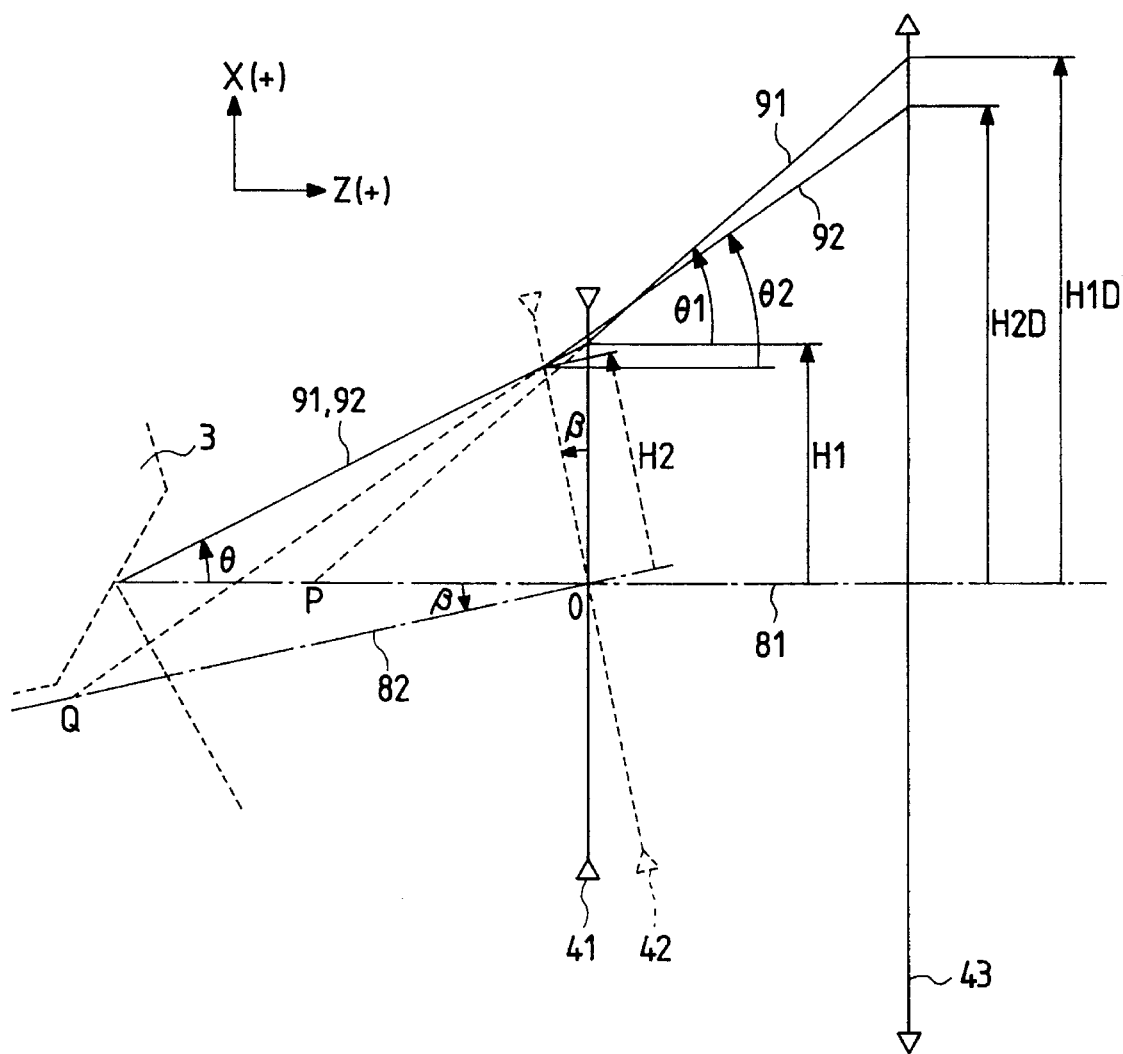
FIG. 3 is a diagram showing the layout of lens components in the plane of scanning by the prior art scanner shown in FIG. 2.

FIG. 3 shows the layout of the respective lens elements in the scanning plane (X–Z plane) as they are represented by single principal faces, with their thicknesses being neglected for the sake of simplicity in explanation.

In FIG. 3, numeral reference 81 refers to the optical axis through the lens element 43 and the spherical lens element as it takes the position indicated by solid line 41; 82 is the optical axis of the spherical lens element as it takes the position indicated by dashed line 42; and 91 is a beam that emerges from the lens 41 in the case where the spherical lens has no error in layout. In the designation of angles, minus sign "−" is used when they are taken in a counterclockwise direction.

Let us start our discussion by supposing that the spherical lens element which initially takes the position indicated by solid line 41 experiences an error in layout through angle β (<0) in the scanning plane about the point of intersection 0 between said spherical lens element and the optical axis 81, whereupon the spherical lens element takes the new position indicated by dashed line 42. Also make the following assumption: $\theta_1$=the angle the beam 91 forms with the optical axis 81 after refraction with the spherical lens element taking the position 41; $\theta_2$=the angle the beam 92 forms with the optical axis 81 after refraction with the spherical lens element taking the position 42 (θ is the scan angle and assumed to be smaller than zero); H1 (>0)=the height of intercept of incident beam 91 at the spherical lens element taking the position 41; H2 (>0)=the height of intercept of incident beam 92 at the spherical lens element taking the position 42; P=the point of intersection between the optical axis 81 and an extension of the beam 91 after refraction with the spherical lens element taking the position 41; and Q=the point of intersection between the optical axis 82 and an extension of the beam 92 after refraction with the spherical lens element taking the position 42. The spherical lens element taking the position 41 or 42 has a negative power P1 and the lens element 43 has a positive power P2, which may be expressed as follows:

$$P1<0, P2>0 \tag{3}$$

A formula in geometrical optics states:

$$\theta_1 = \theta + H1 \times P1 \tag{4}$$

Similarly, $$(\theta_2 - \beta) = (\theta - \beta) + H2 \times P1 \tag{5}$$

$$\theta_2 = \theta + H2 \times P1 \tag{6}$$

Equations 4 and 6 give:

$$\theta_2 - \theta_1 = P1 \times (H2 - H1) \tag{7}$$

If $|\theta| > |\beta|$ (8)

then, as is clear from FIG. 3, the following relationship holds:

$$H1 > H2 \tag{9}$$

Equations 3, 7 and 9 give:

$$\theta_2 - \theta_1 > 0 \tag{10}$$

Equations 3, 4 and 6 give:

$$\theta_1, \theta_2 < 0 \tag{11}$$

If the height of intercept of beam 91 at lens 43 is written as H1D and the height of intercept of beam 92 at lens 43 as H2D, then equations 8 and 10 give:

$$H1D > H2D \tag{12}$$

Write P1Y and P2Y for the powers of lens 43 in a direction normal to the scan direction with respect to beams 91 and 92, respectively. Let us suppose that both powers take a positive value. If the power of lens 43 is assumed to vary with the height of beam intercept in such a way that the former decreases with the increase in the absolute value of the latter, then the following relationship holds:

$$P2Y > P1Y \tag{13}$$

Since P1Y is so set that beam 91 will focus to form image on the photoreceptor drum surface 6, beam 92 is bent in a more-than-necessary amount by excessive power P2Y (eq. 13) and focused to form image not on the photoreceptor drum surface 6 but at a point closer to the rotating polygonal mirror (see FIG. 2).

Similarly, eq. 12 holds when θ>0. However, since $$H1D, H2D < 0 \tag{14}$$

the relationship between P2Y and P1Y is reversed as:

$$P2Y < P1Y \tag{15}$$

Hence, beam 92 is bent in a less-than-necessary amount by unduly small power P2Y and focused to form image not on the photoreceptor drum surface 6 but at a point farther away from the rotating polygonal mirror.

As described above, the use of an asymmetrically shaped lens element in combination with another lens element suffers from the disadvantage that any error in the layout of the two lens elements can cause significant and by no means negligible effects on the curvature of field that would develop in a direction normal to the scan direction. To avoid this problem, the combination of the two lens elements is replaced by the use of a single lens element in the present invention.

Relation 2 sets forth the condition to be satisfied for focusing a laser beam on the surface of a photoreceptor drum to form a beam of a predetermined size in accordance with the required resolution as it scans over the drum's surface at uniform speed.

With a single lens element both surfaces of which are spherical in the scan direction, an incident beam is bent in the marginal portion by a more-than-necessary larger amount than on the optical axis and, hence, the image plane in the scan direction is curved toward the rotating polygonal mirror (in the "−" direction) and the error in image height increases (in the "+" direction) at the intermediate image height. This causes the need to prevent beams from being bent by more-than-necessary amounts in the marginal lens portion by employing a hyperbolic cross-sectional geometry where conic constant K is smaller than zero, not a circle with K=0. This approach is particularly effective in the case where condition 2 is satisfied. If the lower limit of this condition is not reached, the curvature of field in the scan direction increases (+) and the error in image height decreases (−) at the intermediate height. If, on the other hand, the upper limit of condition 2 is exceeded, the curvature of field in the scan direction decreases (−) and the error in image height increases (+) at the intermediate height.

The following example is provided for the purpose of further illustrating the present invention but is in no way to be taken as limiting.

EXAMPLE

Figure 1:
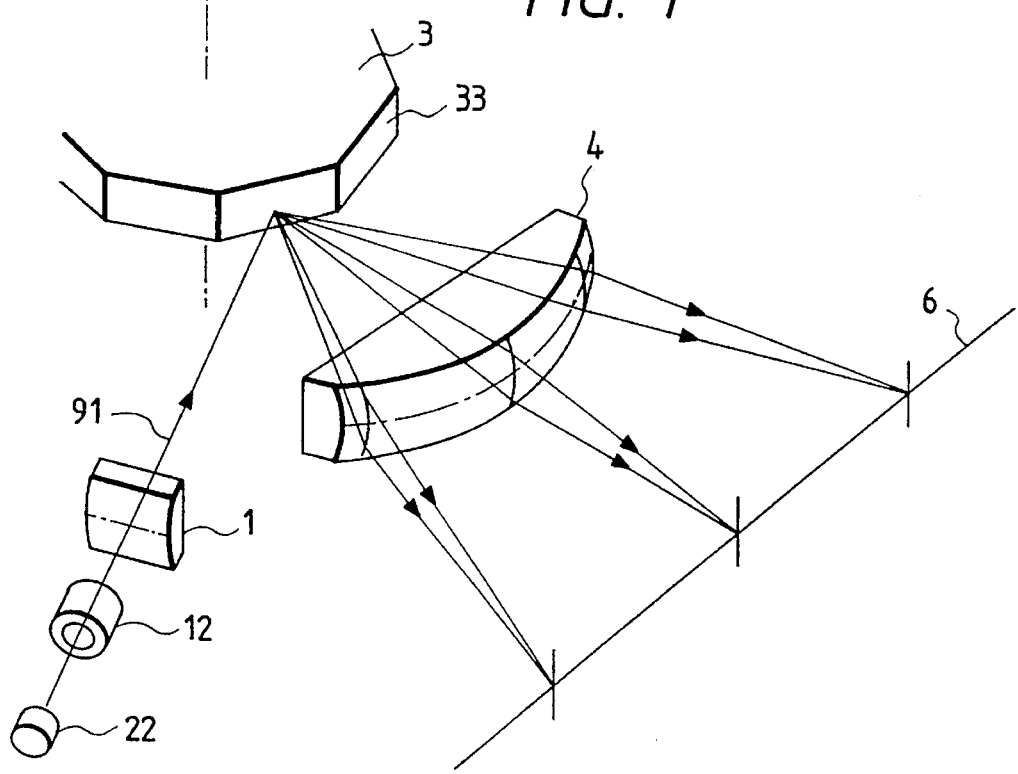
FIG. 1 is a diagram showing an example of the laser scanner of the invention.

FIG. 1 shows the basic layout of an example of the optical scanner of the invention. Shown by 1 in FIG. 1 is a cylindrical lens, 3 is a rotating polygonal mirror, 4 is an fθ lens, 6 is the surface of a photoreceptor drum, 12 is a collimator lens, 22 is a laser light source, 33 is a reflecting face of the polygonal mirror 3, and 91 is a laser beam.

Beam 91 issuing from the laser light source 22 passes through the collimator lens 12 to be substantially collimated. Cylindrical lens 1 is disposed in such a way as to act only in Y direction which is normal to the scan direction, whereby the beam will converge in Y direction at a point near the reflecting face 33 of the polygonal mirror 3. In terms of geometrical optics, the neighborhood of the reflecting face 33 and the photoreceptor drum surface 6 satisfy a conjugate relationship in the direction normal to the scan direction. The beam scanning fθ lens 4 is a single element with the surface closer to the polygonal mirror 3 being spherical whereas the surface remote from the polygonal mirror is of such a shape that it is asymmetric on right and left sides with respect to the optical axis, with the curvature in the direction normal to the scan direction varying gradually in the scan direction in accordance with the specific rotating position of the polygonal mirror. Exemplary data of the specifications of the cylindrical lens 1 and the fθ lens 4 are shown in Table 1 below.

TABLE 1

| Surface | R | r | d | n |
|---------|------|------|------|-------|
| (1) | ∞ | 33.4 | 5.0 | 1.609 |
| (2) | ∞ | ∞ | 52.5 | 1.0 |
| (3) | ∞ | ∞ | 96.0 | 1.0 |
| (4) | 601 | 601 | 30.0 | 1.522 |
| (5) | −188.3 | −42.8 | 274.0 | 1.0 |
| (6) | ∞ | | | | a = 1. 3E-6
b = 8. 6E-7
c = 5. 2E-10
d = 6. 7E-11
K = −1. 64

The respective surface numbers designate the following: (1) and (2) are the surfaces of cylindrical lens 1; (3) is the reflecting face 33 of polygonal mirror 3; (4) and (5) are the surfaces of fθ lens 4; and (6) is the photoreceptor drum surface 6. Other symbols in Table 1 designate the following: R, the on-axis radius of curvature in the scan direction; r, the on-axis radius of curvature in the direction normal to the scan direction; d, the distance between adjacent lens surfaces; and n, refractive index. The shape of surface (5) is expressed by the following equations 16 and 17, with the origin taken at the vertex of the surface:

$$Z = \frac{1}{K+1}\left\{R+\sqrt{R^2-(K+1)\left(\frac{XR}{R-Z'}\right)^2}\right\}\left(1+\frac{Z'}{R}\right)+Z'+aY^4+bX^2Y^2+cX^2Y^4+dX^4Y^2+e \quad (16)$$

$$Z' = Y^2/r\{1+\sqrt{1-(Y/r)^2}\} \quad (17)$$

where a, b, c, d and K are constants, with K being particularly named a "conic constant", and e is an asymmetricity term which is a collection of the sampling points listed in Table 2 below. Any positions that are not listed there are given by polynomial approximation.

TABLE 2

| | (X and Y are in mm and e is in μm) | | | | |
|---|---|---|---|---|---|
| | | | Y | | |
| X | −8 | −4 | 0 | 4 | 8 |
| −70 | 3.5 | 0.9 | 0 | 0.9 | 3.5 |
| −58 | 2.3 | 0.6 | 0 | 0.6 | 2.3 |
| −42 | 2.2 | 0.5 | 0 | 0.5 | 2.2 |
| −23 | 1.3 | 0.3 | 0 | 0.3 | 1.3 |
| 0 | 0 | 0 | 0 | 0 | 0 |
| 23 | 0 | 0 | 0 | 0 | 0 |
| 42 | −1.0 | −0.3 | 0 | −0.3 | −1.0 |
| 58 | −3.2 | −0.8 | 0 | −0.8 | −3.2 |
| 70 | −3.5 | −0.9 | 0 | −0.9 | −3.5 |

Figure 4:
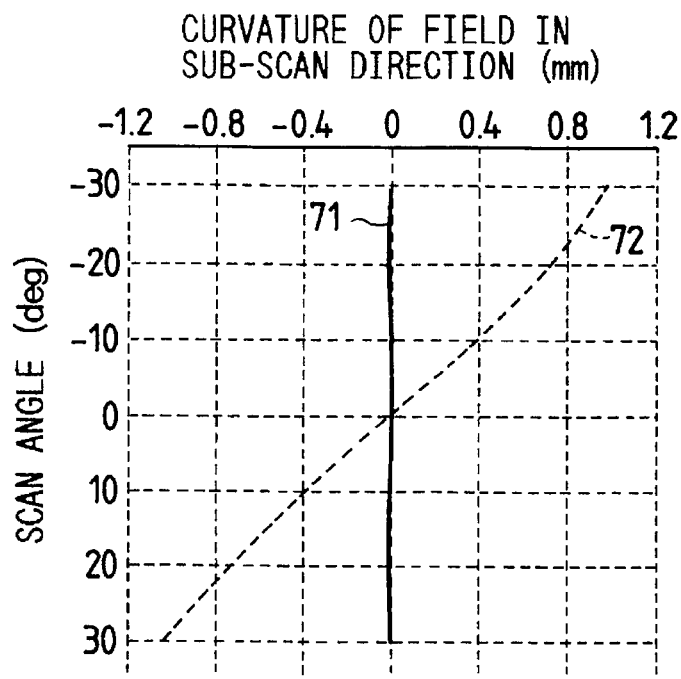
FIG. 4 is a graph plotting the profiles of field curvature that occur in the laser scanner of the invention and the prior art version.

FIG. 4 is a graph plotting the profiles of field curvature occurring in the laser scanner of the invention and the prior art version by curves 71 and 72, respectively, for the case where the spherical lens element involves a layout error (β) of 0.8° in the scanning plane.

Figure 5:
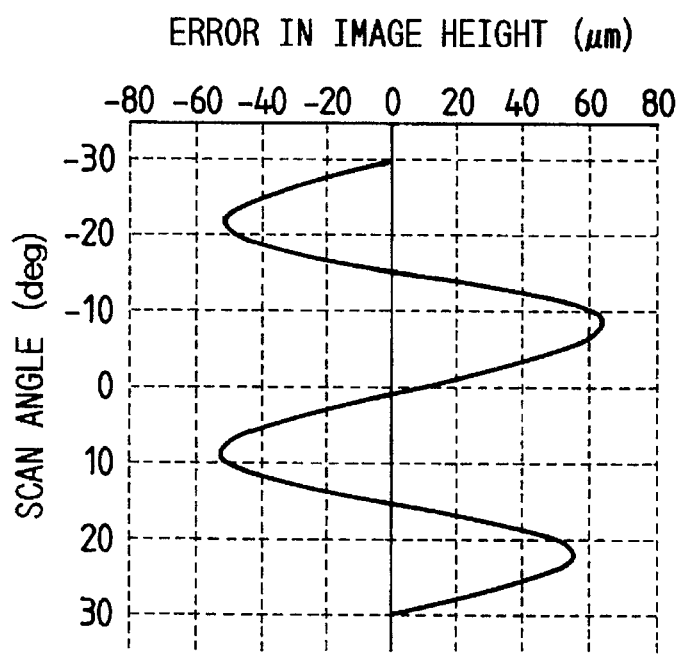
FIG. 5 is a graph plotting the error in image height vs scan angle for the laser scanner of the invention.

FIG. 5 is a graph plotting the error in image height vs scan angle for the laser scanner of the invention.

As described on the foregoing pages, the laser scanner of the present invention is so constructed that at least one lens surface of an fθ lens assembly that is composed of a single lens element is of such a geometry that the curvature in a direction normal to the scan direction varies gradually in the scan direction in accordance with the specific rotating position of the polygonal mirror. Therefore, the laser scanner is simple in construction and yet achieves high resolution experiencing only a small curvature of the image plane in a direction normal to the scan direction.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A laser scanner comprising:
   a laser light source for generating a laser beam;

an optical deflector for deflecting the laser beam from said laser light source;

a scanning lens for allowing a reflected light from said optical deflector to scan over a surface of interest, said optical deflector and said surface of interest being disposed in such a way that they satisfy a generally conjugate imaging relationship through said scanning lens in a direction normal to a scanning direction;

wherein said scanning lens comprises a single lens element and at least one surface of said scanning lens is of such a geometry that a curvature in a direction normal to the scanning direction varies gradually in the scanning direction in accordance with a specific deflecting position of said optical deflector, wherein the geometry of at least one lens surface of said scanning lens in the scanning direction is expressed by equation (1) and satisfies the relation (2):

$$Z = X^2/R \left(1 + \sqrt{1 - (K+1)(X/R)^2}\right) \quad (1)$$

$$-0.54 \leq (U'/U)|K|^{-1/8} \cdot \mathrm{SIG}(K) \leq 0.48 \quad (2)$$

where
- R: the radius of curvature on an optical axis;
- K: the conic constant;
- U: the angle a ray of light giving a maximum scan width forms with the optical axis on an entrance side of said scanning lens;
- U': the angle a ray of light giving a maximum scan width forms with the optical axis on an exit side of said scanning lens; and
- Z and X: surface coordinates in the direction of the optical axis and in the scanning direction, respectively.

* * * * *